US006770817B2

(12) United States Patent
Kuwayama et al.

(10) Patent No.: US 6,770,817 B2
(45) Date of Patent: Aug. 3, 2004

(54) STRUCTURE FOR WATERPROOFING TERMINAL-WIRE CONNECTING PORTION AND METHOD OF WATERPROOFING THE SAME

(75) Inventors: Yasumichi Kuwayama, Shizuoka (JP); Toshihiro Maki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/046,710

(22) Filed: Jan. 17, 2002

(65) Prior Publication Data

US 2002/0096352 A1 Jul. 25, 2002

(30) Foreign Application Priority Data

Jan. 19, 2001 (JP) ........................................ 2001-012311

(51) Int. Cl.[7] ................................................ H02G 15/02
(52) U.S. Cl. .................................................... 174/84 C
(58) Field of Search ............................ 174/74 R, 75 C, 174/84 C; 439/877

(56) References Cited

U.S. PATENT DOCUMENTS 1,827,297 A 10/1931 Moore
3,011,010 A * 11/1961 Lively .................... 174/138 F
3,143,595 A * 8/1964 Martin ...................... 174/84 C
3,708,611 A * 1/1973 Dinger ...................... 174/84 C
3,834,004 A 9/1974 Ayers
3,844,923 A 10/1974 Sandrock
3,934,333 A * 1/1976 Churchill .................... 219/523
4,772,235 A 9/1988 Lustig
4,830,408 A * 5/1989 Reimert ....................... 285/27
5,045,527 A * 9/1991 Ikeno et al. ................ 505/410
5,408,743 A * 4/1995 Tournier et al. .............. 29/863
5,499,448 A * 3/1996 Tournier et al. .............. 29/863
6,261,137 B1 * 7/2001 Wilcox ..................... 174/84 C
2001/0016459 A1 * 8/2001 Livshiz et al. .............. 439/877
2002/0034898 A1 * 3/2002 Kuwayama et al. ........ 439/877
2002/0050385 A1 * 5/2002 Murakami et al. ........ 174/74 R

FOREIGN PATENT DOCUMENTS

| | | | | |
|---|---|---|---|---|
| DE | 77 12 883 | | | 9/1977 |
| DE | 28 34 360 | | | 2/1980 |
| DE | 3149048 | | * | 6/1983 |
| DE | 89 12 290 | | | 12/1989 |
| DE | 693 02 525 | T2 | | 7/1993 |
| DE | 42 41 456 | A1 | | 8/1993 |
| DE | 694 03 299 | T2 | | 4/1995 |
| DE | 298 06 778 | U1 | | 9/1999 |
| DE | 298 20 129 | U1 | | 5/2000 |
| DE | 100 45 263 | A1 | | 3/2002 |
| EP | 0 086 459 | B1 | | 2/1983 |
| EP | 0 087 072 | B1 | | 2/1986 |
| GB | 815044 | | | 6/1959 |
| JP | 2-12680 | | | 1/1990 |
| JP | 2-12680 | | | 4/1990 |
| JP | 7-161392 | | | 6/1995 |

* cited by examiner

*Primary Examiner*—Chau N. Nguyen
(74) *Attorney, Agent, or Firm*—Sughrue Mion, PLLC

(57) ABSTRACT

A conductor portion (3) and an insulating sheath (4) of a wire (2) are inserted in a generally-cylindrical wire connection portion (32) of a terminal, and in this condition the wire connection portion (32) is compressively pressed radially uniformly over an entire periphery thereof, so that the conductor portion and the insulating sheath are held in intimate contact with an inner peripheral surface of the wire connection portion. The wire connection portion (32) has a smaller-diameter insertion hole for the conductor portion (3), and a larger-diameter insertion hole for the insulating sheath (4), the insertion holes being disposed in coaxial relation to each other.

4 Claims, 6 Drawing Sheets

STRUCTURE FOR WATERPROOFING TERMINAL-WIRE CONNECTING PORTION AND METHOD OF WATERPROOFING THE SAME

BACKGROUND OF THE INVENTION

This invention relates to a structure and a method of waterproofing a terminal-wire connecting portion, in which an end portion of a wire is inserted into a generally cylindrical terminal, and the terminal is compressively pressed over an entire periphery thereof to be connected to the wire end portion, and at the same time the end portion of the wire is waterproofed.

FIGS. 11A and 11B show one form of related terminal-wire connecting portion waterproofing structure and method (See JP-A-2-12680U).

As shown in FIG. 11A, a wire connection portion 45, provided at a rear half portion of a terminal 44, is press-fastened to an end portion of an insulating sheathed wire 41, and a conductor portion 42 of the wire 41 is held and connected between an insulating sheath 43 of the wire 41 and the terminal 44, and a waterproof seal material 46 is filled between the terminal 44 and the insulating sheath 43, and the conductor portion 42 of the wire 41 is embedded in the waterproof seal material 46, and is waterproofed as shown in FIG. 11B.

The insulating sheath 43 of the wire 41 is made of a soft vinyl resin or the like, and the wire 41 can be flexed to a certain degree. In this example, the conductor portion 42 comprises one copper wire or aluminum wire for high voltage purposes, and this conductor portion is folded back into a generally U-shape at the distal end portion of the insulating sheath 43, and is disposed between the outer peripheral surface of the insulating sheath 43 and a bottom plate portion 47 of the terminal 44, and is pressed against the bottom plate portion 44 by a resilient force of the insulating sheath 43, and is connected thereto.

The wire connection portion 45 includes two (front and rear) pairs of press-clamping piece portions 48, and each pair of press-clamping piece portions extend upwardly respectively from opposite side edges of the bottom plate portion 47, and each press-clamping piece portion 48 is pressed into a curved shape around the outer periphery of the insulating sheath 43 as shown in FIG. 11B. The waterproof seal material 46 is filled at the inner surface of each press-clamping piece portion 48 and the inner surface of the bottom plate portion 47. For example, a hot-melt resin material or a soft resin material, such as rubber, is used as the waterproof seal material 46. The hot-melt resin material has such a nature that it is melt upon heating, and then is solidified by natural cooling. The waterproof seal material 46 prevents water from intruding into the portion of contact between the conductor portion 42 and the terminal 44.

The pressing of each pair of press-clamping piece portions 48 can be effected using, for example, a pair of upper and lower dies (not shown) having arcuate inner surfaces, respectively. The insulating sheath 43 is removed from the end portion of the wire 41, thereby exposing the conductor portion 42, and this conductor portion 42 is bent and folded back into a generally U-shape to extend along the insulating sheath 43, and the end portion of the wire 41 is inserted and set in the wire connection portion 45 of the terminal 44, and the waterproof seal material 46 is filled in the inside of the wire connection portion 45, and the press-clamping piece portions 48 are simultaneously pressed into a curved shape by the pair of upper and lower dies of a clamping machine (not shown). As a result, the portion of connection between the conductor portion 42 and the terminal 44 is covered with the waterproof seal material 46, and is protected, and also the conductor portion 42 is resiliently held between the insulating sheath 43 and the bottom plate portion 47 of the terminal 44, and is connected thereto.

A front half portion of the terminal 44 is formed into a female-type electrical contact portion 49 for a mating terminal (not shown). In this example, the electrical contact portion 49 includes a tubular portion 50 for receiving a male terminal (electrode) of high-voltage part, such as a spark plug and a secondary coil, and a resilient contact portion (not shown) provided within the tubular portion 50 so as to hold the mating male terminal (not shown). For example, a secondary current of high voltage is fed from the conductor portion 42 of the wire 41 to the electrical contact portion 49 of the terminal 44, and is further fed from the electrical contact portion 49, for example, to a spark plug.

In the above related terminal-wire connecting portion waterproofing structure and method, however, the conductor portion 42 is exposed at a front end 43*a* of the insulating sheath 43, and therefore there has been encountered a problem that this exposed portion is liable to be oxidized. Even if the exposed portion of the conductor portion 42 is covered with the waterproof seal material 46 at the front end of the insulating sheath 43, the waterproof seal material 46 does not exist between each pair of right and left press-clamping piece portions 48, and when a strong force, such as a bending force, a pulling force and a twisting force, acted on the wire 41, there was a fear that a gap was liable to develop between the outer peripheral surface of the insulating sheath 43 and the waterproof seal material 46, so that the waterproof performance could be lowered.

And besides, when the waterproof seal material 46 intruded between the conductor portion 42 and the bottom plate portion 47 of the terminal 44 before the pressing operation, there was a fear that the conducting performance after the pressing operation was deteriorated. In addition, when the conductor portion 42 bit into the soft insulating sheath 43, there was a fear that the pressure of contact between the terminal 44 and the conductor portion 42 decreased with the lapse of time, so that the contact performance was deteriorated. Furthermore, the conductor portion 42 is press-fastened between the terminal and the insulating sheath 43 by the front pair of press-clamping piece portions 48, and the press-clamping piece portions 48 do not exist at a position (upper side in FIG. 11B) disposed in symmetrical relation to the conductor portion 42, and therefore there was a fear that the press-fastening force was less liable to become uniform, so that the pressure of contact between the conductor portion 42 and the terminal 44 was liable to be varied.

SUMMARY OF THE INVENTION

With the foregoing in view, it is an object of this invention to provide a structure and a method of waterproofing a terminal-wire connecting portion, in which the performance of contact between a wire conductor portion and a terminal can be enhanced, and besides a waterproof performance of a portion of connection between the conductor portion and the terminal can be enhanced.

In order to solve the aforesaid object, the invention is characterized by having the following arrangement.

(1) A waterproofing structure for a terminal-wire connecting portion comprising:

a wire including a conductor portion and an insulating sheath; and a terminal including a substantially cylindrical wire connection portion, wherein the conductor portion and the insulating sheath are inserted in the wire connection portion, and the wire connection portion is pressed radially uniformly over an entire periphery thereof so that the conductor portion and the insulating sheath are held in intimate contact with an inner peripheral surface of the wire connection portion.

(2) The waterproofing structure according to (1), wherein the wire connection portion includes a smaller-diameter insertion hole for the conductor portion and a larger-diameter insertion hole for the insulating sheath, the smaller-diameter and larger-diameter insertion holes being disposed in coaxial relation to each other.

(3) The waterproofing structure according to (1), wherein one of a waterproof seal material and a waterproof seal member is arranged in an annular shape within the wire connection portion, and an outer peripheral surface of the insulating sheath is held in intimate contact with the one of the waterproof seal material and the waterproof seal member.

(4) The waterproofing structure according to (3), wherein the wire connection portion includes a peripheral groove for receiving the elastic waterproof seal member, and the waterproof seal member is compressed in the peripheral groove.

(5) Method of waterproofing a terminal-wire connecting portion comprising the steps of:

simultaneously inserting a conductor portion and an insulating sheath of a wire into a substantially cylindrical wire connection portion of a terminal; and pressing radially uniformly the wire connection portion over an entire periphery thereof to be compressively plastically deformed.

(6) The method according to (5), wherein the conductor portion is inserted into a smaller-diameter insertion hole formed in the wire connection portion, the insulating sheath is inserted into a larger-diameter insertion hole formed in the wire connection portion in coaxial relation to the smaller-diameter insertion hole, and the smaller-diameter and larger-diameter insertion holes are pressed radially.

(7) The method according to (5), wherein the pressing step is performed under a state in which one of a waterproof seal material and a waterproof seal member is arranged in an annular shape with respect to an outer peripheral surface of the insulating sheath within the wire connection portion.

(8) The method according to (7), wherein the pressing step is performed under a state in which a peripheral groove for receiving the elastic waterproof seal member is formed in an inner surface of the wire connection portion, and the waterproof seal member is mounted in the peripheral groove.

(9) The method according to (5), wherein the pressing is effected by a rotary swaging machine.

BRIEF DESCRIPTION OF THE DRAWINGS

FIG. 11 shows one form of related terminal-wire connecting portion waterproofing structure and method.

DETAILED DESCRIPTION OF PREFERRED EMBODIMENTS

A preferred embodiment of the present invention will now be described in detail with reference to the drawings.

FIGS. 1 to 4 show a structure and a method of waterproofing a terminal-wire connecting portion, provided in accordance with a first embodiment of the invention.

Figure 1:
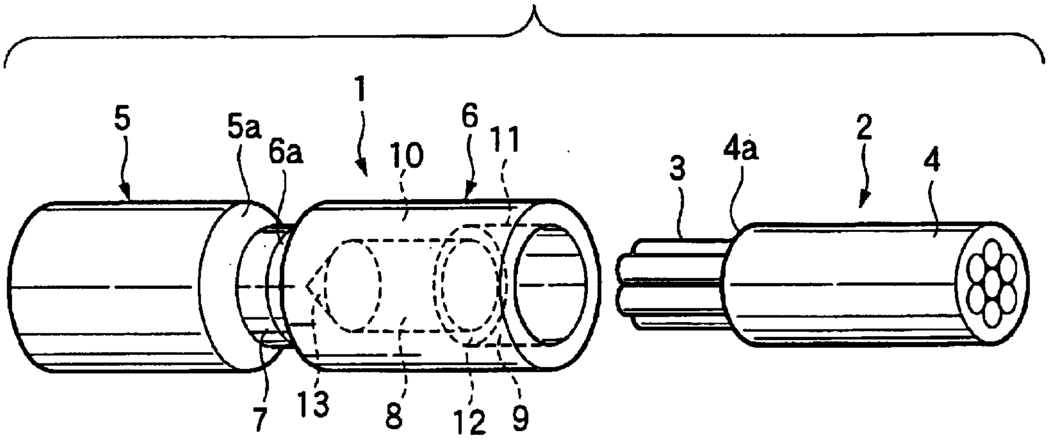
FIG. 1 is an exploded, perspective view showing a structure and a method of waterproofing a terminal-wire connecting portion, provided in accordance with a first embodiment of the invention.
Figure 2:
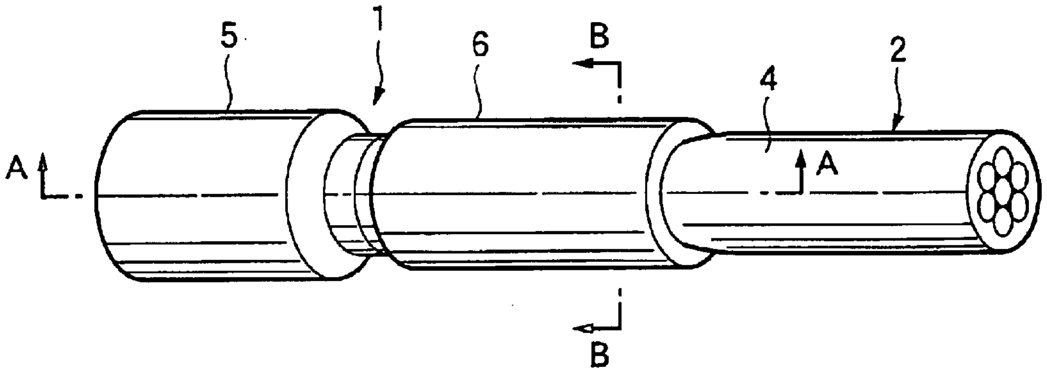
FIG. 2 is a perspective view showing a condition in which a terminal and a wire are connected together in a waterproofed manner by an entire-periphery pressing operation.

In FIG. 1, reference numeral 1 denotes a female terminal made of electrically-conductive metal such as a copper alloy, aluminum or an aluminum alloy, and reference numeral 2 denotes a wire in which a conductor portion 3, composed of copper wires, aluminum wires or the like, is exposed at an end portion thereof.

The terminal 1 has a cylindrical electrical contact portion 5 (for mating male terminal (not shown)) at one side portion (front half portion), and also has a cylindrical wire connection portion 6 at the other side portion (rear half portion), and the electrical contact portion 5 and the wire connection portion 6 are integrally interconnected by an intermediate portion (interconnecting portion) 7 of a smaller diameter. In this embodiment, although the outer diameter of the electrical contact portion 5 is larger than the outer diameter of the wire connection portion 6, the two outer diameters, inner diameters, wall thicknesses and lengths of the electrical contact portion 5 and wire connection portion 6 can be suitably determined in accordance with the kind of mating male terminal (not shown) and the kind of wire 2.

The wire connection portion 6 has a cross-sectionally-circular front insertion hole 8 of a smaller diameter for the conductor portion 3 of the wire 2, and a cross-sectionally-circular rear insertion hole 9 of a larger diameter for an insulating sheath 4, the two insertion holes being disposed in coaxial relation to each other. The diameter of the front insertion hole 8 is slightly larger than the outer diameter of the conductor portion 3, and the diameter of the rear insertion hole 9 is slightly larger than the outer diameter of the insulating sheath 4, and therefore the wire 2 can be smoothly inserted into the wire connection portion 6. A wall thickness of a peripheral wall 10 of the front insertion hole 8 is larger while a wall thickness of a peripheral wall 11 of the rear insertion hole 9 is smaller. The outer peripheral surfaces of the peripheral walls 10 and 11 of the two insertion holes 8 and 9 have the same outer diameter, and are continuous with each other, with no step formed therebetween. The front insertion hole 8 has a length equal to or slightly larger than the length of the exposed portion of the conductor portion 3. A step portion 12 is formed between the two insertion holes 8 and 9, and the length of insertion of the wire 2 can be determined, for example, by abutting a front end 4*a* of the insulating sheath 4 against the step portion 12.

A tapering portion 13 of a conical shape is formed in the front end of the insertion hole 8 by drilling. A partition wall, defining the intermediate interconnecting portion 7, is formed between the front insertion hole 8 and the electrical contact portion 5, and the front insertion hole 8 is sealed by the partition wall 7. A front end portion 6*a* of the wire connection portion 6 and a rear end portion 5*a* of the electrical contact portion 5 are slanting in a tapering manner, and are continuous with the interconnecting portion 7 of a smaller diameter. Even in the case where an air vent hole, communicating the insertion hole 8, 9 with the exterior, is formed through each of the peripheral walls 10 and 11 of the wire connection portion 6 so as to discharge the air during the pressing operation, these air vent holes are completely closed during the entire-periphery pressing operation, and therefore this will not be any problem at all from a waterproof point of view.

In FIG. 1, the end portion of the wire 2, that is, the exposed conductor portion 3, and the insulating sheath 4, extending from this conductor portion 3, are inserted and set in the cylindrical wire connection portion 6. In this condition, the wire connection portion 6 is pressed to be compressively plastically deformed uniformly over the entire length thereof and over the entire periphery thereof. The term "pressed uniformly" means that the outer peripheral surface of the wire connection portion 6 is all pressed radially toward the center of the wire 2 with a uniform force as indicated by arrows P in FIG. 3.

Figure 4:
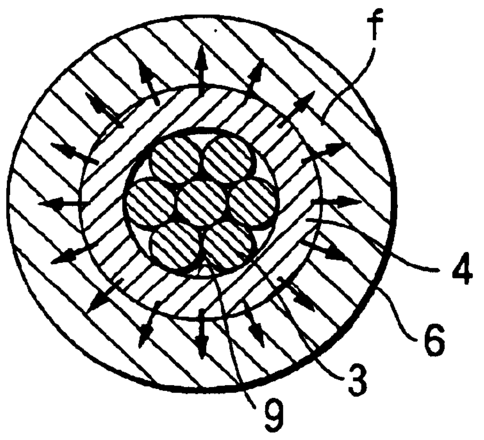
FIG. 4 a cross-sectional view taken along the line B—B of FIG. 2.

As a result of this entire-periphery pressing, the cylindrical wire connection portion 6 is compressed radially, and is extended in the longitudinal direction, and thus is plastically deformed, and the conductor portion 3 of the wire 2 is pressed hard radially by the thick front peripheral wall 10, and those element wires of the conductor portion 3, disposed at the outer peripheral portion thereof, bite into the inner peripheral surface of the front insertion hole 8, and is held in intimate contact therewith, with no gap formed therebetween, and also the element wires of the conductor portion 3 are pressed hard in the radial direction, and are deformed to assume a honeycomb-like shape, and are intimately contacted with one another, with no gap formed therebetween, and at the same time the insulating sheath 4 of the wire 2 is pressed hard radially by the thin rear peripheral wall 10, and is compressively deformed, and the outer peripheral surface of the insulating sheath 4 is held in firm, intimate contact with the inner peripheral surface of the rear insertion hole 9 by a restoring reaction force as indicated by arrows f in FIG. 4, thereby achieving a waterproof effect.

Figure 3:
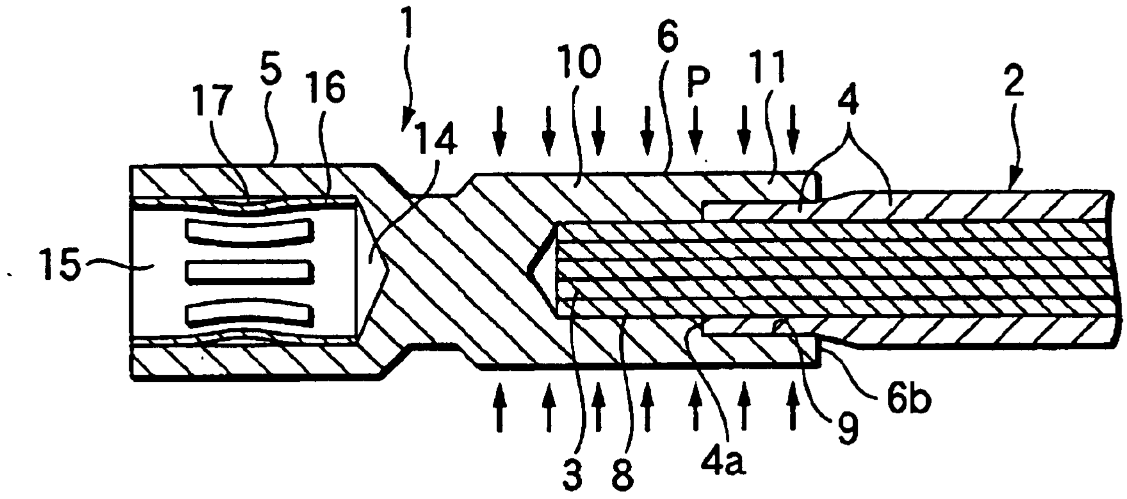
FIG. 3 is a cross-sectional view taken along the line A—A of FIG. 2.

The wire connection portion 6 is compressively pressed over the entire periphery thereof (over the entire circumference thereof) with the uniform force, and therefore the insulating sheath 4 is compressed over the entire periphery thereof with the uniform force by the wire connection portion 6, and is held in intimate contact with the inner peripheral surface of the rear portion of the wire connection portion 6 over the entire periphery thereof with the uniform restoring reaction force (resilient force) f, with no gap formed therebetween. As a result, the high waterproof performance is achieved. As shown in FIG. 3, the insulating sheath 4 extends outwardly from a rear end 6*b* of the wire connection portion 6 in a tapering or curved manner to have the free diameter.

Even in the case where an aluminum material is used for the conductor portion 3 of the wire 2 and the terminal 1, an oxide film is prevented from being formed on the outer peripheral surface of the conductor portion 3 and the inner peripheral surface of the wire connection portion 6 with the lapse of time, since the outer peripheral surface of the conductor portion 3 is held in intimate contact with the inner peripheral surface of the wire connection portion 6, with no gap formed therebetween. Even if an oxide film is initially formed, this oxide film is removed by the friction when those element wires of the conductor portion 3, disposed at the outer peripheral portion thereof, bite into the inner peripheral surface of the wire connection portion 6, and therefore the high electrical contact performance is achieved because of a lower conducting resistance.

The conductor portion 3 and the insulating sheath 4 are pressed hard against the inner peripheral surface of the wire connection portion 6 by the restoring reaction force, so that the force of fixing of the wire 2 to the wire connection portion 6 increases, and therefore the wire 2 is prevented from being withdrawn from the terminal 1 even when a strong pulling force or the like acts on the wire 2. The conductor portion 3 and the insulating sheath 4 can be simultaneously press-fastened and fixed to the terminal 1 by one pressing operation, and therefore the structure of the terminal 1 is simplified, and also the pressing operation can be effected easily and efficiently.

As shown in FIG. 3, the length of compressive pressing of the insulating sheath 4 need only to be generally equal to or smaller than the length of compressive pressing of the conductor portion 3. The outer peripheral surface of the insulating sheath 4, compressively pressed radially uniformly over the entire periphery thereof, is held in intimate contact with the inner peripheral surface of the wire connection portion 6 with no gap formed therebetween, and therefore the intrusion of water, dust and the like into the wire connection portion 6, that is, toward the conductor portion 3, is positively prevented.

In FIG. 3, reference numeral 15 denotes one form of resilient contact member inserted in the inside of the electrical contact portion 5. This resilient contact member 15 comprises a single electrically-conductive metal sheet 16, and a plurality of contact spring piece portions 17 are stamped and raised inwardly, and this metal sheet 16 is curled into a cylindrical shape, so that the contact spring piece portions 17 are arranged at equal intervals in the circumferential direction. The mating male terminal (not shown) are inserted along the inner surfaces of the contact spring piece portions 17, and is connected thereto.

One preferred form of entire-periphery pressing means for compressively pressing the wire connection portion 6 of the terminal 1 over the entire periphery is rotary swaging. In this working method, the conductor portion 3 and insulating sheath 4 of the wire 2 are simultaneously compressively pressed uniformly over their entire periphery within the cylindrical wire connection portion 6 of the terminal 1, using a rotary swaging machine 16 of FIG. 5.

The rotary swaging machine 16 includes a working portion which comprises a plurality of (four in this embodiment) dies 17, which are arranged at equal intervals in the direction of the periphery of the wire 2, and strike against the wire connection portion 6 radially to compressively deform the same while rotating in a direction of arrow C, hammers 18 integrally connected respectively to the dies 17, a spindle 19 for rotating the dies 17 and the hammers 18 in the peripheral direction in unison, a motor (not shown) for driving the spindle 19, guide rollers 20 for sliding contact with cam surfaces 18*a* formed respectively at outer surfaces of the hammers 18, and an outer ring 21 held in sliding contact with outer surfaces of the guide rollers 20.

Each of the guide rollers 20 is supported, for example, on a working portion body 22 so as to rotate about its axis. Each die 17 has an inner surface 17*a* of an arcuate shape which corresponds to or is larger than the outer diameter of the compressively-pressed wire connection portion 6. The die 17 and the hammer 18 are fixedly secured to each other, for example, by a bolt or the like, and only the dies 17 can be exchanged in accordance with the outer diameter of the terminal 1 to be worked.

Figure 5:
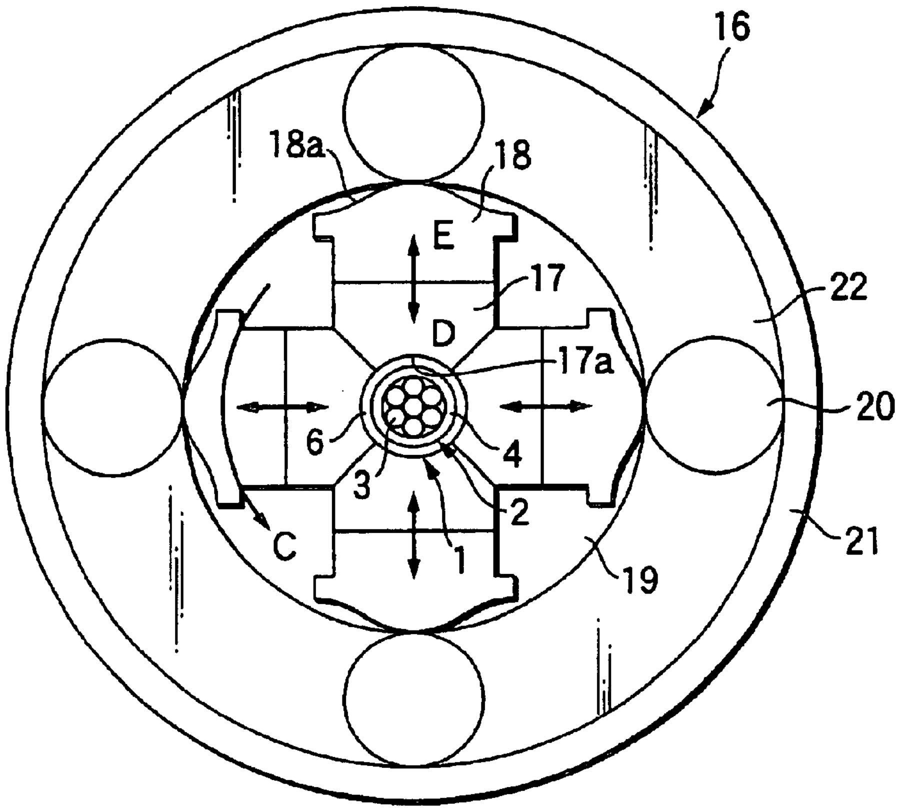
FIG. 5 is a front-elevational view showing a rotary swaging machine which is one form of entire-periphery pressing means.

As the spindle 19 rotates, the cam surfaces 18*a* of the hammers 18 contact the guide rollers 20, respectively, and the dies 17 are slid in a diameter-reducing direction (as indicated by arrow D) to compress the wire connection portion 6 of the terminal 1. When the apex of each cam surface 18*a* is brought into contact with the guide roller 20 as shown in FIG. 5, the amount of inward movement of the die 17 is the maximum. Then, a foot portion of each cam surface 18*a* is brought into sliding contact with the guide roller 20, and the die 17 is slid outwardly under the influence of a centrifugal force, so that a gap is formed between the die and the wire connection portion 6 of the terminal 1. As the spindle 19 rotates, the dies 17 are repeatedly opened and closed, and the wire connection portion 6 of the terminal 1 is compressively plastically deformed in the diameter-reducing direction uniformly over the entire periphery thereof. As a result, the conductor portion 3 of the wire 2 is held in intimate contact with the inner peripheral surface of the front half portion of the wire connection portion 6 while the insulating sheath 4 is held in intimate contact with the inner peripheral surface of the rear half portion of the wire connection portion 6.

In FIG. 5, instead of providing the four guide rollers 20, eight guide rollers can be arranged circumferentially at equal intervals. Instead of providing the four dies 17, two dies can be arranged circumferentially at an equal interval.

Figure 6:
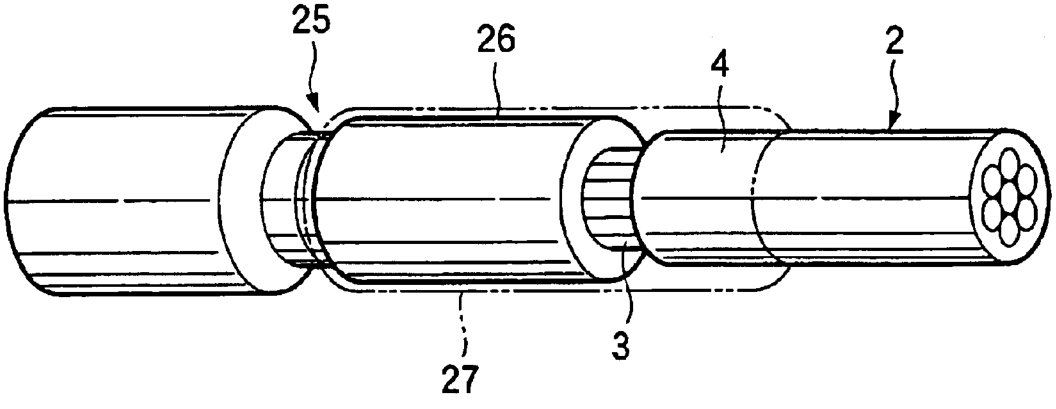
FIG. 6 is a perspective view showing, for information purposes, a structure and a method of waterproofing a terminal-wire connecting portion, provided in accordance with a second embodiment of the invention.

FIG. 6 shows, for information purposes, a structure and a method of waterproofing a terminal-wire connecting portion, provided in accordance with a second embodiment of the invention.

This waterproofing structure and method are characterized in that only a conductor portion 3 of a wire 2 is connected to a cylindrical wire connection portion 26 of a terminal 25 by compressively pressing the wire connection portion 26 uniformly over the entire periphery thereof by rotary swaging as in the first embodiment, and then at least an exposed portion of the conductor portion 3 (lying between a rear end of the wire connection portion 26 and a front end of an insulating sheath 4 of the wire 2) and those portions (the wire connection portion 26 and the insulating sheath 4), disposed immediately adjacent respectively to front and rear ends of this exposed portion, is covered with a waterproof seal material 27 (indicated in a broken line), and is waterproofed by this seal material.

One example of waterproof seal material 27 is an existing hot-melt resin material. The hot-melt resin material is melted at a high temperature, and is cooled to be solidified at an ordinary temperature, and by doing so, the hot-melt resin material is caused to adhere to the exposed surface of the conductor portion 3, the surface of the insulating sheath 4 and the surface of the wire connection portion 26. Instead of the hot-melt resin material, a soft resin material, always exhibiting elasticity, can be caused to adhere to the exposed surface of the conductor portion 3, the surface of the insulating sheath 4 and the surface of the wire connection portion 26.

In this second embodiment, the conductor portion 3 of the wire 2 can be tightly connected to the wire connection portion 26 of the terminal 25 with no gap formed therebetween as in the first embodiment, and also element wires of the conductor portion 3 can be intimately contacted with one another with no gap formed therebetween, so that the performance of the connection of the wire 2 and the terminal 25 can be enhanced. And besides, the exposure of the conductor portion 3 is prevented by the waterproof seal material 27, thereby positively preventing water, dust and so on from intruding into the conductor portion 3 and the wire connection portion 26.

FIGS. 7 to 10 show a structure and a method of waterproofing a terminal-wire connecting portion, provided in accordance with a third embodiment of the invention.

This waterproofing structure and method are the most excellent as compared with the above two embodiments. More specifically, in the first embodiment, although the insulating sheath 4 of the wire 2 is compressed, its resilient reaction force f is small, and the pressure of contact between the outer peripheral surface of the insulating sheath 4 and the inner peripheral surface of the wire connection portion 6 of the terminal 1 is not so large, and there is a fear that the waterproof ability is lowered, for example, by a water pressure as developing in a high-pressure washing operation, and the reduced elasticity of the insulating sheath 4 with the lapse of time.

In the second embodiment (FIG. 6), a relatively-bulky apparatus is needed, for example, for melting the hot-melt resin material (serving as the waterproof seal material 27) and for filling it around the exposed conductor portion 3, and therefore the cost is high, and besides there is a fear that the time and labor for the production increase partly because time is required for cooling the hot-melt resin material.

In view of these, this embodiment is characterized in that in addition to the construction of the first embodiment, a waterproof seal member 33 is provided within a wire connection portion 32 of a terminal 31.

Figure 7:
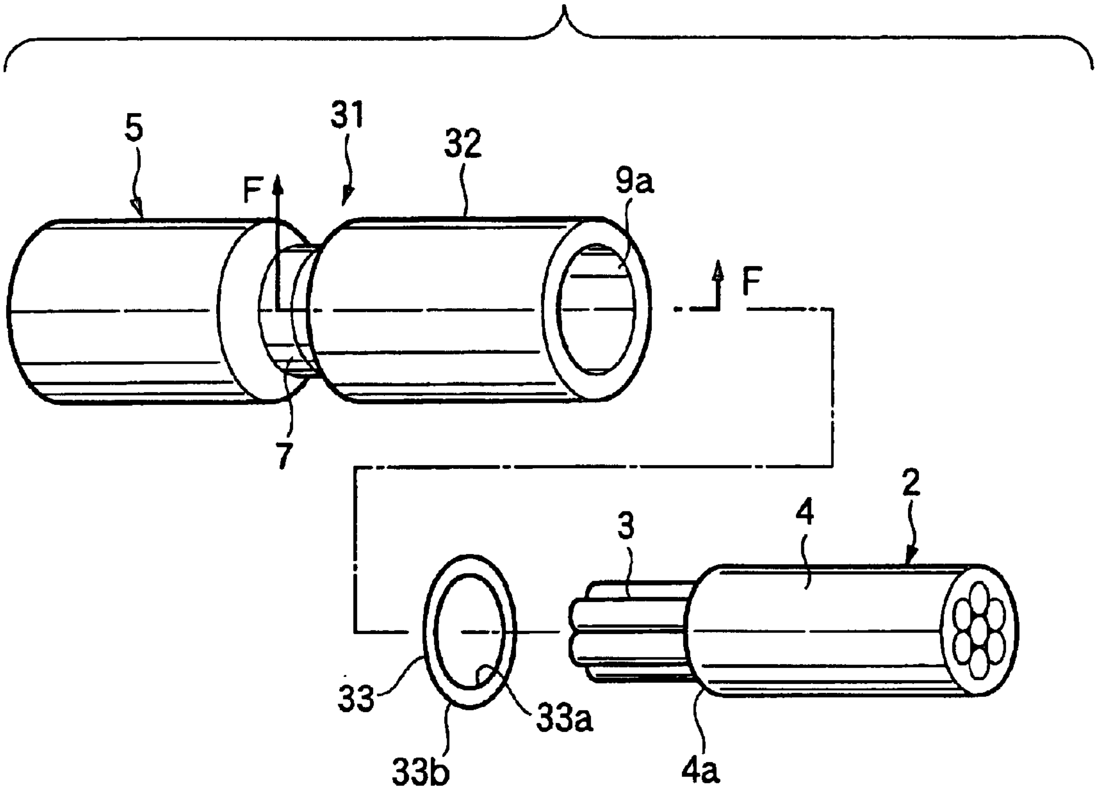
FIG. 7 is an exploded, perspective view showing a structure and a method of waterproofing a terminal-wire connecting portion, provided in accordance with a third embodiment of the invention.
Figure 8:
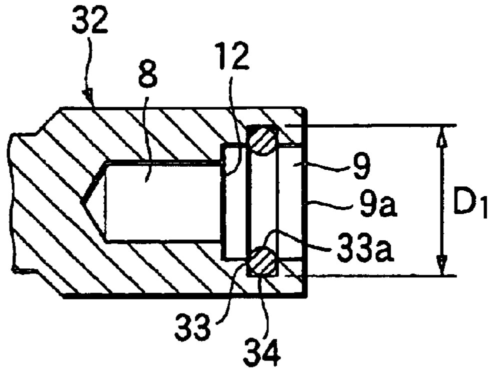
FIG. 8 is a cross-sectional view taken along the line F—F of FIG. 7.

As shown in FIG. 7 and FIG. 8 (cross-sectional view taken along the line F—F of FIG. 7), the terminal 31 has a cylindrical electrical contact portion 5 of the female type at one side portion (front half portion), and also has the cylindrical wire connection portion 32 at the other side portion (rear half portion), and the electrical contact portion 5 and the wire connection portion 32 are interconnected by an intermediate interconnecting portion 7 of a smaller diameter in coaxial relation to each other. The electrical contact portion 5 is similar to that of the first embodiment of FIG. 3, and therefore explanation thereof will be omitted. Those constituent portions, identical to those of the first embodiment, will be designated by identical reference numerals, respectively, and detailed explanation thereof will be omitted.

The wire connection portion 32 is characterized in that it has a front insertion hole 8 of a smaller diameter for a conductor portion 3 of a wire 2, and a rear insertion hole 9 of a larger diameter for an insulating sheath 4 of the wire 2 as in the first embodiment of FIGS. 1 and 3, the two insertion holes being disposed in coaxial relation to each other, and that an annular peripheral groove 34 for fittingly receiving the waterproof seal member is formed in an inner peripheral surface of the rear insertion hole 9.

The annular waterproof seal member, such as an O-ring 33, is fitted in the peripheral groove 34, and in this condition the exposed conductor portion 3 (which is an end portion of the wire 2) and the insulating sheath 4, extending from this conductor portion 3, are inserted respectively in the front and rear insertion holes 8 and 9, and the outer peripheral surface of the insulating sheath 4 is contacted with an inner peripheral portion (inner diameter portion) 33*a* of the O-ring 33 with a suitable contact pressure, thereby achieving a waterproof/dustproof effect for the interior of the wire connection portion 32.

The inner diameter of the front insertion hole 8 is slightly larger than the outer diameter of the conductor portion 3, and the inner diameter of the rear insertion hole 9 is slightly larger than the outer diameter of the insulating sheath 4. A groove bottom diameter $D_1$ of the peripheral groove 34 is generally equal to or slightly larger than the outer diameter of the O-ring 33, and the inner diameter of the O-ring 33 is smaller than the inner diameter of the rear insertion hole 9, and the inner diameter of the O-ring 33 is smaller than the outer diameter of the insulating sheath 4. The inner diameter of the O-ring 33 relative to the outer diameter of the insulating sheath 4, that is, a fastening amount, is suitably determined in accordance with the wire diameter.

Preferably, the outer diameter of the conductor portion 3 is smaller than the inner diameter of the O-ring 33, and with this arrangement the conductor portion 3 can be smoothly passed through the O-ring 33 without being curled, bent or folded. In the case where the conductor portion 3 comprises a single copper wire or a single aluminum wire, there is no problem with the insertion even if the outer diameter of the conductor portion 3 is generally equal to or larger than the inner diameter of the O-ring 33.

The depth (length) of the front insertion hole 8 is generally equal to the length of the exposed portion of the conductor portion 3. A front end 4*a* of the insulating sheath 4 is abutted against a step portion 12 formed between the two insertion holes 8 and 9, so that the length of insertion of the wire 2 is accurately determined. The front end 4*a* of the insulating sheath 4 is inserted into the O-ring 33 while spreading the inner peripheral portion 33*a* of the O-ring 33, and the insulating sheath 4 is inserted into the insertion hole 9 while the outer peripheral surface of the insulating sheath 4 slides in contact with the inner peripheral surface 33*a* of the O-ring 33. The friction between the wire 2 and the O-ring 33 prevents the withdrawal of the wire 2 to a certain degree, and the wire 2 is held in its set condition unless the wire 2 is intentionally pulled. Therefore, the pressing operation at the subsequent step can be effected easily.

Although it is preferred that the peripheral groove 34 be disposed generally at a lengthwise-central portion of the rear insertion hole 9, it may be disposed closer to an opening 9*a* of the insertion hole 9. When it is desired to reduce the overall length of the terminal 31, the rear insertion hole 9 is shortened, and the peripheral groove 34 is disposed close to the opening 9*a* of the insertion hole 9, thereby securing the amount of insertion of the insulating sheath 4 of the wire 2 into the rear insertion hole 9.

Figure 9:
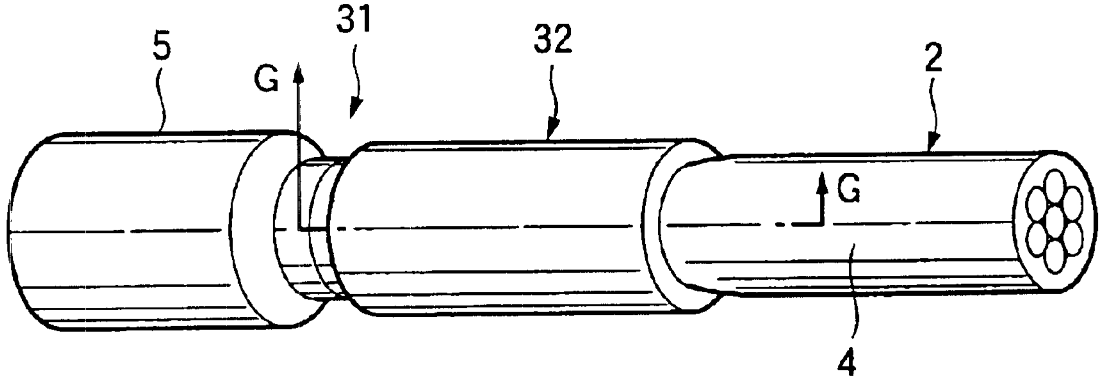
FIG. 9 is a perspective view showing a condition in which a terminal and a wire are connected together in a waterproofed manner by an entire-periphery pressing operation.
Figure 10:
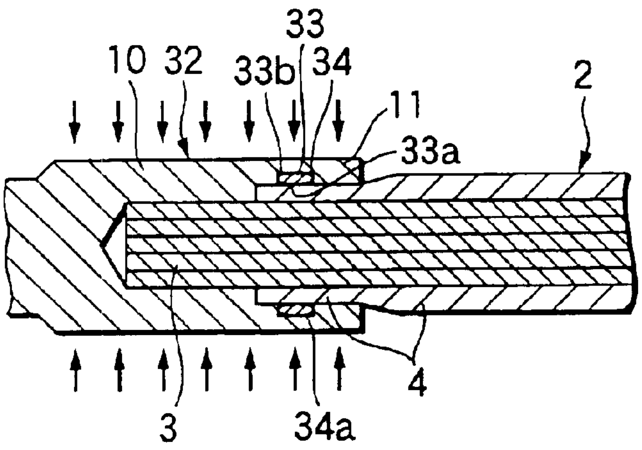
FIG. 10 is a cross-sectional view taken along the line G—G of FIG. 9.
Figure 11A:
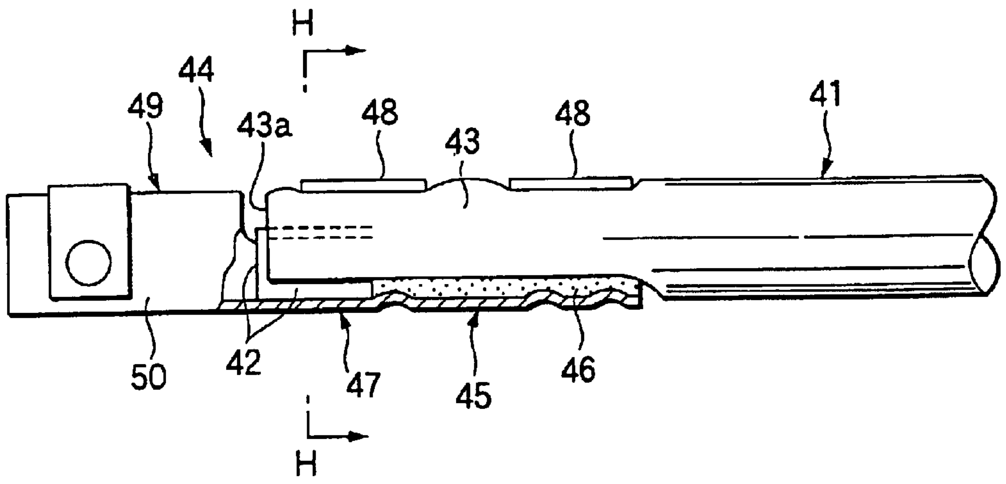
FIG.11A PRIOR ART
FIG. 11A is a side-elevational view.
Figure 11B:
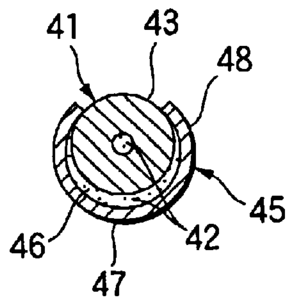
FIG.11B PRIOR ART
FIG. 11B is a cross-sectional view taken along the line H—H of FIG. 11A.

As described above, the O-ring 33 is mounted in the wire connection portion 32 of the terminal 31, and the end portion of the wire 2 is inserted and set in the wire connection portion 32, and in this condition the wire connection portion 32 of the terminal 31 is compressively pressed radially uniformly over the entire periphery thereof as shown in FIGS. 9 and 10, using entire-periphery pressing means such as rotary swaging means, as described above for the first embodiment. The rotary swaging can be effected by the use of the rotary swaging machine 16 of FIG. 5. The working machine 16 is the same as described above, and therefore explanation thereof will be omitted.

As a result of the entire-periphery uniform pressing of the wire connection portion 32 shown in FIGS. 9 and 10, the wire connection portion 32 is reduced in diameter uniformly, and therefore an outer peripheral portion (outer diameter portion) 33*b* of the O-ring 33 is pressed in a diameter-reducing direction by a groove bottom 34*a* of the peripheral groove 34. Namely, the peripheral groove 34 is also reduced in diameter together with a peripheral wall 11 of the wire connection portion 32, and therefore the O-ring 33 is compressed hard toward the center of the wire, so that the inner peripheral portion 33*a* of the O-ring 33 is held in firm, intimate contact with the outer peripheral surface of the insulating sheath 4. As a result, regardless of the reduced elasticity of the O-ring 33 with the lapse of time, the O-ring 33 is forcibly held in firm, intimate contact with the insulating sheath 4, so that the waterproof effect is markedly enhanced.

As in the first embodiment, the inner peripheral surface of the rear portion of the wire connection portion 32 of the terminal 31 is held in firm, intimate contact with the outer peripheral surface of the insulating sheath 4, and this also achieves the waterproof and dustproof effect, and therefore the waterproof effect is further enhanced by the synergistic effect achieved in cooperation with the O-ring 33.

The O-ring 33 is held in firm, intimate contact with the outer peripheral surface of the insulating sheath 4 and the groove bottom surface 34*a* of the peripheral groove 34, and therefore the interior of the wire connection portion 32 is kept air-tight, and the ambient atmosphere will not intrude into the conductor portion 3, and therefore the outer peripheral surface of the conductor portion 3 of an aluminum material, the surface of each element wire and the inner peripheral surface of the terminal 31 of an aluminum material are prevented from oxidation (formation of an oxide film) with the lapse of time, and the good conducting performance is secured, and the reliability of the electrical connection is enhanced.

Even if the groove bottom diameter $D_1$ of the peripheral groove 34 is larger than the outer diameter of the O-ring 33 in the initial condition of FIG. 8 before the pressing operation, the groove bottom diameter of the peripheral groove 34 is reduced by the entire-periphery pressing of FIG. 10 to thereby compress the O-ring 33 radially. In the case where the initial groove bottom diameter $D_1$ of the peripheral groove 34 is set to a value larger than the outer diameter of the O-ring 33, the O-ring 33 is freely increased in diameter when the insulating sheath 4 of the wire 2 is inserted into the O-ring 33, and therefore the insertion force of the wire 2 is reduced, so that the operation is easy.

As in the first embodiment (FIG. 3), the conductor portion 3 of the wire 2 is held in intimate contact with the inner peripheral surface of the front portion of the peripheral wall 11 of the wire connection portion 32 of the terminal 31 in biting relation thereto, with no gap formed therebetween, and also the element wires of the conductor portions 3 are intimately contacted with one another with no gap formed therebetween, and therefore the electrical contact performance is enhanced. By the entire-periphery pressing, the wire connection portion 32 is reduced in diameter, and at the same time it is extended longitudinally.

Instead of the O-ring 33, a square ring or other form of waterproof packing can be used. Such waterproof members (33) are not limited to elastic synthetic rubber, but can be made of a synthetic resin material such as soft vinyl similar to that used for insulating sheath 4 of the wire 2. The peripheral groove 34 may not be provided, and an annular waterproof seal member (not shown), having a flat cross-section, can be mounted on the inner peripheral surface of the rear insertion hole 9 of a larger diameter over the entire periphery thereof or on the outer peripheral surface of the insulating sheath 4, and in this condition the insulating sheath 4 can be inserted into the insertion hole 9.

In the first embodiment of FIG. 3, a waterproof seal material (not shown), having an adhesive nature, a soft nature or a solidifying nature, can be coated at an annular region between the outer peripheral surface of the insulating sheath 4 and the inner peripheral surface of the wire connection portion 6, and in this condition the wire connection portion 6 can be compressively pressed radially uniformly over the entire periphery thereof, so that the waterproof seal material can achieve the waterproof/dustproof effect for the conductor portion 3. In this case, it is preferred that the waterproof seal material have at least a certain degree of flowability in its initial condition.

In the initial condition of FIG. 8 before the pressing operation, the inner diameter of the front insertion hole 8 and the inner diameter of the rear insertion hole 9 can be set to the same value, and in this case the end portion of the wire 2, that is, the conductor portion 3 and the insulating sheath 4 are inserted into the insertion holes 8 and 9, respectively, and in this condition the front insertion hole 8 is compressed into a diameter smaller than the diameter of the compressed rear insertion hole 9. In this case, for example, the outer diameter of the peripheral wall 11, defining the front insertion hole 8, may be beforehand set to a larger value while the outer diameter of the peripheral wall 10, defining the rear insertion hole 9, may be set to a smaller diameter. Alternatively, the front insertion hole 8 and the rear insertion hole 9 may be compressed separately from each other, using the dies 17 (FIG. 6) having different inner diameters.

As described above, according to the invention, the conductor portion of the wire is held in intimate contact with the inner peripheral surface of the wire connection portion of the terminal over the entire periphery thereof with the uniform stress, with no gap formed therebetween, and therefore the electrical contact performance is enhanced. And besides, the insulating sheath of the wire is compressed radially uniformly over the entire periphery thereof, and is resiliently intimately contacted with the inner peripheral surface of the wire connection portion, and therefore the interior of the wire connection portion is waterproofed, and the conductor portion and the inner peripheral surface of the wire connection portion are prevented from oxidation. Even in the case where an aluminum material, on which an oxide film is liable to be formed, is used for the conductor portion and the terminal, the formation of an oxide film with the lapse of time is prevented fro the above reason, and therefore the conducting resistance is kept to a lower level, and the good electrical connection is always achieved.

According to the invention, the smaller-diameter conductor portion is held in intimate contact with the inner peripheral surface of the insertion hole, having the corresponding diameter, with no gap formed therebetween, and the larger-diameter insulating sheath is held in intimate contact with the inner peripheral surface of the insertion hole, having the corresponding diameter, with no gap formed therebetween. Therefore, the entire-periphery pressing of the generally-tubular wire connection portion can be carried out effectively with less time and labor, and besides the reliability of the electrical connection and the reliability of the waterproof seal performance can both be enhanced.

According to the invention, the outer peripheral surface of the insulating sheath of the wire is held in intimate contact with the waterproof seal material or the waterproof seal member over the entire periphery thereof with the uniform force, with no gap formed therebetween (the waterproof seal material or the waterproof seal member is held in intimate contact with the outer peripheral surface of the insulating sheath of the wire over the entire periphery thereof with the uniform force, with no gap formed therebetween), and also the waterproof seal material or the waterproof seal member is held in intimate contact with the inner surface of the wire connection portion of the terminal over the entire periphery thereof with the uniform stress, with no gap formed therebetween. Therefore, the intrusion of water and others into the wire connection portion is more positively prevented, and the oxidation of the conductor portion, as well as the oxidation of the inner surface of the terminal, is more positively prevented. The waterproof effect is achieved by the intimate contact of the outer peripheral surface of the insulating sheath with the inner peripheral surface of the wire connection portion, and also the waterproof effect is achieved by the waterproof seal material or the waterproof seal member, and with this synergistic effect, the interior of the wire connection portion is kept air-tight, and the assured waterproof performance is achieved over a long period of time.

According to the invention, when the wire connection portion is pressed, the waterproof seal member is compressed in the peripheral groove, and is intimately contacted with the outer peripheral surface of the insulating sheath with a large pressure. As a result, the waterproof seal effect is markedly enhanced, and besides the interior of the wire connection portion is kept air-tight, and for example, the conductor portion of an aluminum material and the inner surface of the terminal of an aluminum material are more positively prevented from oxidation. In the initial condition before the pressing operation, the waterproof seal member is mounted in the peripheral groove in the terminal, and by doing so, the end portion of the wire can be easily inserted and set in the wire connection portion. Before the wire is pressed, the wire is held by a tightly-holding force of the waterproof seal member, and the withdrawal of the wire is prevented, and therefore the entire-periphery pressing operation can be effected easily.

According to the invention, the generally-tubular wire connection portion of the terminal is repeatedly pounded by the plurality of rotating dies of the rotary swaging machine, and is compressively plastically deformed in the diameter-reducing direction. Therefore, the conductor portion of the wire is compressively pressed with the uniform stress over the entire periphery thereof, and is connected to the wire connection portion, with no gap formed therebetween, and also the insulating sheath of the wire is held in intimate contact with the inner peripheral surface of the wire connection portion with the uniform stress over the entire periphery thereof, with no gap formed therebetween, and the annular waterproof seal member is held in intimate contact with the inner surface of the wire connection portion with the uniform stress over the entire periphery thereof, with no gap formed therebetween. Therefore, the enhanced reliability of the electrical connection and the enhanced waterproof effect are achieved at the same time.

What is claimed is:

1. A structure for waterproofing a terminal-wire connecting portion comprising:

a wire including a conductor portion and an insulating sheath; and a terminal including a substantially cylindrical wire connection portion, wherein the conductor portion and the insulating sheath are inserted in the wire connection portion, and the wire connection portion is messed radially uniformly over an entire periphery of the wire connection portion and over an entire length of the wire connection portion so that the conductor portion and the insulating sheath are held in intimate contact with an inner peripheral surface of the wire connection portion, and the diameter of the wire connection portion is uniformly reduced over an entire periphery and an entire length of the wire connection portion, wherein one of a waterproof seal material and a waterproof seal member is arranged in an annular shape within the wire connection portion, and an outer peripheral surface of the insulating sheath is held in intimate contact with the one of the waterproof seal material and the waterproof seal member.

2. The structure according to claim 1, wherein the waterproof seal member is arranged in the annular shape within the wire connection portion, the wire connection portion includes a peripheral groove for receiving the waterproof seal member, and the waterproof seal member is compressed in the peripheral groove.

3. Method of waterproofing a terminal-wire connecting portion comprising the steps of:

simultaneously inserting a conductor portion and an insulating sheath of a wire into a substantially cylindrical wire connection portion of a terminal; and pressing radially uniformly the wire connection portion over an entire periphery of the wire connection portion and over an entire length of the wire connection portion;

wherein the wire connection portion is compressively plastically deformed so that the diameter of the wire connection portion is uniformly reduced over an entire periphery and an entire length of the wire connection portion, wherein the pressing step is performed under a state in which one of a waterproof seal material and a waterproof seal member is arranged in an annular shape with respect to an outer-peripheral surface of the insulating sheath within the wire connection portion.

4. The method according to claim 3, wherein the waterproof seal member is arranged in the annular shape within the wire connection portion, the pressing step is performed under a state in which a peripheral groove for receiving the waterproof seal member is formed in an inner surface of the wire connection portion, and the waterproof seal member is mounted in the peripheral groove.

* * * * *